No. 873,911. PATENTED DEC. 17, 1907.
H. M. STARLEY.
VEHICLE WHEEL.
APPLICATION FILED SEPT. 18, 1906.

3 SHEETS—SHEET 1.

WITNESSES
INVENTOR
Harold Marshall Starley
BY Richardson
ATTYS

No. 873,911. PATENTED DEC. 17, 1907.
H. M. STARLEY.
VEHICLE WHEEL.
APPLICATION FILED SEPT. 18, 1906.

3 SHEETS—SHEET 2.

WITNESSES
INVENTOR
Harold Marshall Starley
BY
ATTYS

No. 873,911.  
PATENTED DEC. 17, 1907.

H. M. STARLEY.  
VEHICLE WHEEL.  
APPLICATION FILED SEPT. 18, 1906.

3 SHEETS—SHEET 3.

WITNESSES  
Alvin J. White  
W. P. Burk

INVENTOR  
Harold Marshall Starley  
By Richards  
ATTYS

UNITED STATES PATENT OFFICE.

HAROLD MARSHALL STARLEY, OF COVENTRY, ENGLAND.

VEHICLE-WHEEL.

No. 873,911.                Specification of Letters Patent.                Patented Dec. 17, 1907.

Application filed September 18, 1906. Serial No. 335,124.

*To all whom it may concern:*

Be it known that I, HAROLD MARSHALL STARLEY, subject of Great Britain, residing at 14 St. Paul's road, Coventry, in the county of Warwick, England, have invented new and useful Improvements Relating to Road-Vehicle Wheels, of which the following is a specification.

This invention relates to road vehicle wheels, and has for its object to economically construct strong and durable wheels, suitable for motor cars and other road vehicles, from metallic elements or members which can be readily produced and expeditiously assembled.

Figure 1:
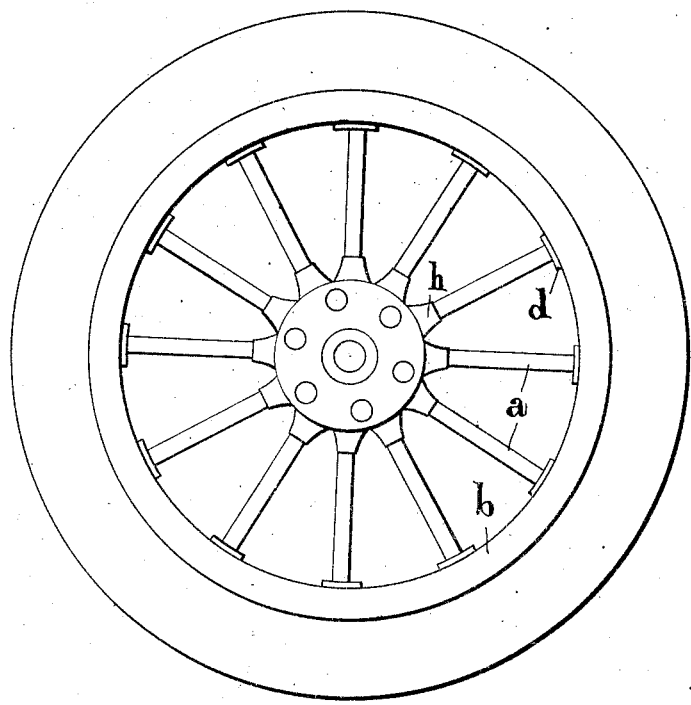
Figure 2:
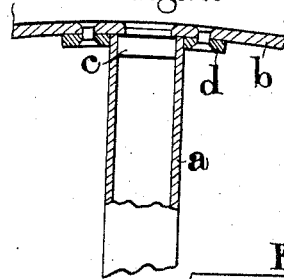
Figure 4:
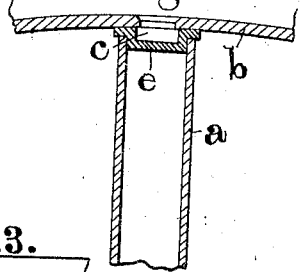
Figure 3:
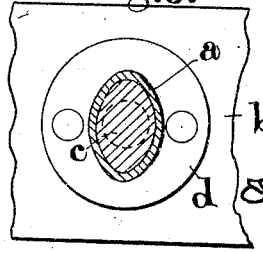
Figure 5:
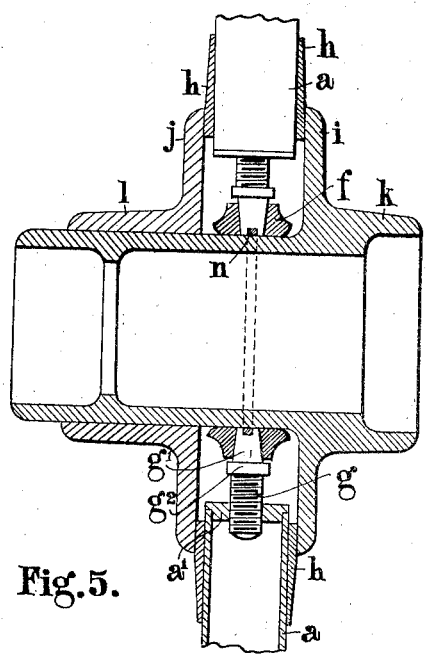
Figure 6:
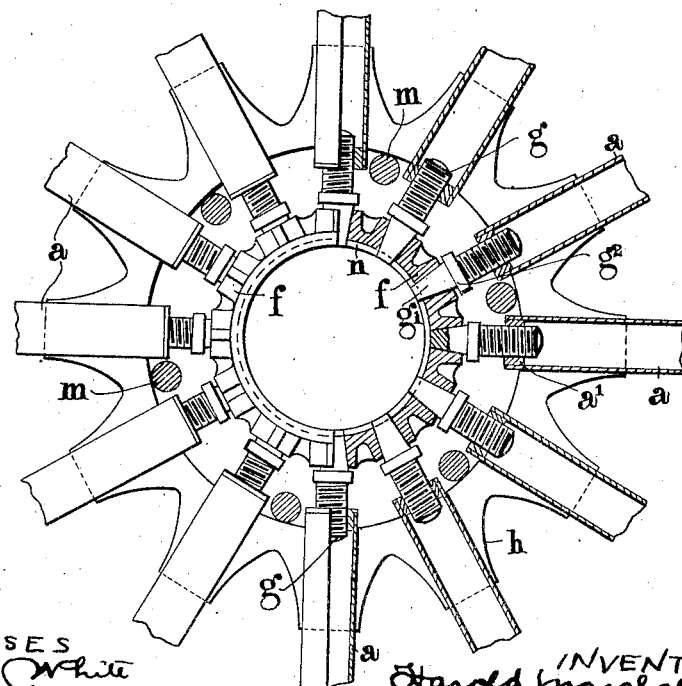
Figure 8:
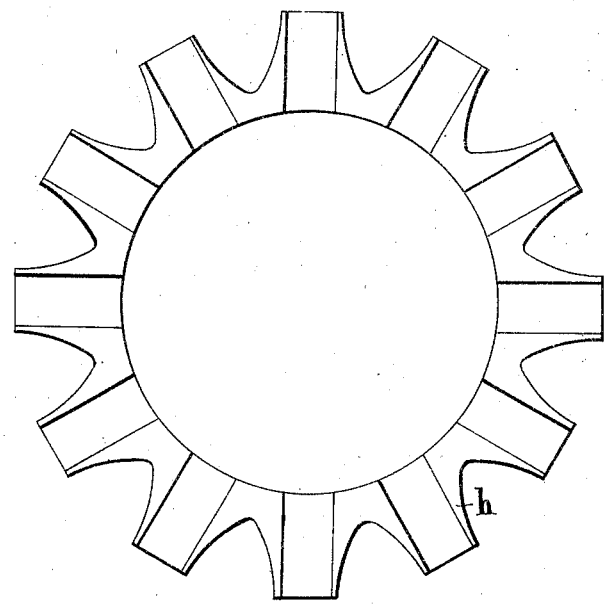
Figure 7:
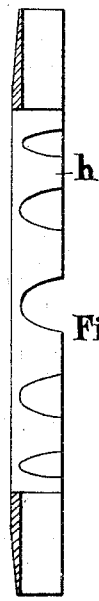

Referring to the three accompanying sheets of explanatory drawings:—Figure 1 is a side elevation of a motor road vehicle wheel constructed in accordance with this invention. Figs. 2 and 3 illustrate in sectional elevation and plan respectively one form of attachment of a spoke to the rim or felly of the wheel, while Fig. 4 is a sectional elevation of a modified attachment. Figs. 5 and 6 are sectional end and front elevations of the central portion of my wheel illustrating one form of connection between the spokes and hub or nave. Figs. 7 and 8 are respectively sectional side elevation and rear elevation of one of a pair of stiffening plates employed for embracing the ends of the spokes adjacent to the wheel hub.

The same reference letters in the different views indicate the same or similar parts.

In one manner of carrying the invention into effect in the construction of a motor car wheel, I form each of the spokes $a$ from steel tube having an elliptical, circular, or other suitable cross section.

In the example shown in the drawings spokes of elliptical cross section are employed. The rim or felly $b$ consists of a continuous steel or other metal band which is provided with upturned edges or lateral flanges, or is otherwise adapted to receive and retain an ordinary rubber tire. On the under or inner side of the said rim $b$ there are formed, or secured, by riveting or otherwise, a number of projecting pieces or driving studs $c$ corresponding to the number of the spokes employed and adapted to enter the same. The said pieces $c$ are as shown at Fig. 3 made to fit closely within the ends of the spokes. A stiffening ring $d$ having an eye or aperture corresponding to the external configuration of the spoke $a$ into which the outer extremity of the said spoke can be inserted, is also preferably attached to the rim around each of the said driving studs $c$. Or in place of the aforesaid driving studs $c$ and stiffening rings $d$ I may employ a flanged plug $e$ (Fig. 4) made to correspond with the internal contour of the spoke and adapted to fit within the outer end of the same; an aperture is formed in the center of each plug to receive a driving stud $c$ firmly secured to the rim $b$.

The hub of the wheel consists in one type of a steel or other suitable metal ring $f$ radially through which there are formed a number of apertures corresponding with the number of spokes in the wheel. Each of the said apertures is suitably shaped to receive a spoke locking bolt $g$ and to serve as an abutment for a conical portion $g'$ or a shoulder $g^2$ formed upon the said bolt $g$. The shoulder $g^2$ of the locking bolt $g$ is adapted to serve also as a head whereby, with the aid of a suitable spanner, it can be rotated. The screw of the bolt enters a nut $a'$ secured in the adjacent extremity of the spoke $a$. In a modification the conical portion $g'$ of the locking bolt $g$ is made to enter the end of the spoke $a$ and the threaded portion the hub of the wheel. In place of the conical portion $g'$ of each bolt or the shoulder $g^2$ I may employ a parallel portion and use a transverse locking peg or cotter which passes laterally through both the ring $f$ and the end of the bolt $g$ within the ring.

The aforesaid elements or members of the wheel are assembled by inserting a locking bolt $g$ into each of the apertures in the ring $f$ of hub and screwing the spokes over the same to a sufficient extent to enable the rim or felly $b$ to be placed in position around their outer extremities. By then rotating the locking bolts as aforesaid the spokes $a$ are moved radially outwards into engagement with the projecting pieces $c$ and stiffening rings $d$ and pressed tightly against the rim $b$.

By suitably disposing the locking bolts $g$ and the apertures therefor in either the hub ring $f$ or the rim $b$ an inclined arrangement of the spokes relatively to the plane of the wheel can be obtained; thus by arranging for the bolts to be alternately secured at or near the opposite sides of the ring $f$ an alternately and oppositely inclined disposition of the spokes is obtained.

For increasing the lateral rigidity of the spokes at their junction with the hub ring $f$, a dished plate $h$ adapted to embrace each of the spokes is provided on both sides of the wheel; one of the plates is shown in detail at Figs. 7 and 8. The said plates are suitably shaped or recessed on their inner faces to fit closely on to the spokes and on the outer sides are made to form a fillet or curved base like part around the base of the spokes as shown at Fig. 1 and thus improve the appearance of the wheel. The retention of the plates in position is preferably effected by flanges $i$ and $j$, the former being made on the hub $k$ of the wheel and the latter on a sleeve $l$ which fits over the said hub, the plates $h$ being held tightly together by bolts $m$ passing through the flanges $i$ and $j$.

To prevent accidental unscrewing of the bolts $g$ in spokes $a$ by vibration or otherwise, a slot is formed in each of the bolt heads and a groove is formed around the inner circumference or eye of the hub ring $f$. The length of the bolts is such that when tightly screwed into the spokes the said slots coincide with the groove in the hub ring. A split ring $n$ is then sprung into the slots and groove to lock the bolts; the ring $n$ is itself retained in position by the hub $k$ which is afterwards inserted. In a modification one of the plates $h$ is formed integrally with the fixed flange of the hub and the other with the detachable flange.

Having thus described our invention, what we claim and desire to secure by Letters Patent is:—

1. In road vehicle wheels, the combination consisting of a hub ring having circumferential seating apertures therein, screwed locking bolts seated within the said hub ring apertures, inwardly projecting driving studs secured to the wheel rim, and tubular metal spokes in engagement at their respective extremities with the said locking bolts and driving studs, as set forth.

2. In road vehicle wheels, the combination consisting of a hub ring having conical circumferential seating apertures therein, screwed locking bolts having conical ends seated within the said hub ring apertures, driving studs secured to and inwardly projecting from the wheel rim, and tubular metal spokes having their respective ends in engagement with the said driving studs and locking bolts as set forth.

3. In road vehicle wheels, the combination consisting of a hub ring having circumferential seating apertures therein, a rim with inwardly projecting driving studs secured thereto, tubular metal spokes in engagement at their outer extremities with the said studs, locking bolts screwed into the inner ends of the spokes and fitting within the aforesaid seating apertures of the hub ring, and stiffening plates embracing the inner extremities of the spokes and secured to the same, as set forth.

4. In road vehicle wheels, the combination consisting of a hub ring having circumferential seating apertures therein, inwardly projecting driving studs and embracing pieces secured to the wheel rim, tubular metal spokes in engagement at their outer extremities with the said driving studs and embracing pieces, locking bolts screwed into the inner ends of the spokes and fitting within the aforesaid seating apertures of the hub ring, stiffening plates embracing the inner extremities of the spokes, and retaining flanges for securing the said stiffening plates, as set forth.

In testimony whereof I have signed my name to this specification in the presence of two subscribing witnesses.

HAROLD MARSHALL STARLEY.

Witnesses:
EDWARD MARKS,
JOHN MORGAN.